United States Patent
Katiyar (10) Patent No.: US 8,519,303 B2
(45) Date of Patent: Aug. 27, 2013

(54) CORED WELDING ELECTRODE AND METHODS FOR MANUFACTURING THE SAME

(75) Inventor: Rajeev Katiyar, Mentor, OH (US)

(73) Assignee: Lincoln Global, Inc., City of Industry, CA (US)

( * ) Notice: Subject to any disclaimer, the term of this patent is extended or adjusted under 35 U.S.C. 154(b) by 2702 days.

(21) Appl. No.: 11/132,889

(22) Filed: May 19, 2005

(65) Prior Publication Data

US 2006/0261054 A1   Nov. 23, 2006

(51) Int. Cl.
   *B23K 35/02*   (2006.01)
(52) U.S. Cl.
   USPC ............... 219/145.22; 219/145.1; 219/146.31
(58) Field of Classification Search
   USPC ............... 219/145.22, 146.31, 145.1, 146.52; 508/389, 110; 72/41, 42, 46
   See application file for complete search history.

(56) References Cited

U.S. PATENT DOCUMENTS

| | | | |
|---|---|---|---|
| 1,525,840 A | | 2/1925 | Weed |
| 1,722,929 A | | 7/1929 | Lincoln |
| 2,606,874 A | * | 8/1952 | James Garner et al. ........ 516/25 |
| 2,785,285 A | * | 3/1957 | Bernard .................... 219/146.22 |
| 2,944,142 A | | 7/1960 | Sjoman |
| 2,957,825 A | * | 10/1960 | Henricks ....................... 508/158 |
| 2,964,612 A | * | 12/1960 | Savard et al. ............. 219/145.32 |
| 3,122,506 A | * | 2/1964 | Koolen et al. ................. 508/167 |
| 3,478,552 A | * | 11/1969 | Dane ................................ 72/42 |
| 3,534,390 A | | 10/1970 | Woods et al. |
| 3,947,655 A | | 3/1976 | Gonzalez et al. |
| 4,186,293 A | | 1/1980 | Gonzalez et al. |
| 4,305,197 A | | 12/1981 | Puschner et al. |
| 4,379,811 A | | 4/1983 | Puschner et al. |
| 4,404,828 A | * | 9/1983 | Blachford ........................ 72/42 |
| 4,510,374 A | * | 4/1985 | Kobayashi et al. ........ 219/146.1 |
| 4,551,610 A | | 11/1985 | Amata |
| 4,629,110 A | | 12/1986 | Holmgren et al. |
| 4,717,536 A | | 1/1988 | Chai et al. |
| 4,723,061 A | | 2/1988 | Munz et al. |
| 4,800,131 A | | 1/1989 | Marshall et al. |
| 4,833,296 A | | 5/1989 | Crockett et al. |
| 5,003,155 A | * | 3/1991 | Chai et al. ................. 219/145.22 |
| 5,015,823 A | | 5/1991 | Crockett et al. |
| 5,055,655 A | | 10/1991 | Chai et al. |
| 5,118,919 A | | 6/1992 | Chai et al. |

(Continued)

FOREIGN PATENT DOCUMENTS

| CA | 2107706 | 5/1994 |
|---|---|---|
| JP | 57-193299 | 11/1982 |

(Continued)

OTHER PUBLICATIONS

European Search Report EP 06 00 0265, Aug. 23, 2006.

*Primary Examiner* — Alexandra Elve
(74) *Attorney, Agent, or Firm* — Shannon V. McCue; Hahn Loeser & Parks LLP (57) ABSTRACT

A manufacturing method is presented for manufacturing cored welding electrode, including provision of a cored electrode structure with core fill material substantially enclosed within a sheath material, and application of a sodium based feeding lubricant to the cored electrode structure. A cored welding electrode is provided, including a tubular sheath material with a center core area, a core fill material within the core area, and a sodium based lubricant coating on the sheath material, wherein the lubricant comprises sodium sulfate, sodium carbonate, and/or sodium nitrite.

34 Claims, 4 Drawing Sheets

(56) References Cited

U.S. PATENT DOCUMENTS

| | | | |
|---|---|---|---|
| 5,120,931 | A | 6/1992 | Kotecki et al. |
| 5,233,160 | A | 8/1993 | Gordish et al. |
| 5,365,036 | A | 11/1994 | Crockett et al. |
| 5,369,244 | A | 11/1994 | Kulikowski et al. |
| 5,550,348 | A * | 8/1996 | Masaie et al. ............ 219/145.22 |
| 5,821,500 | A | 10/1998 | Araki et al. |
| 5,973,291 | A | 10/1999 | Kramer et al. |
| 6,079,243 | A | 6/2000 | Inoue et al. |
| 6,103,997 | A | 8/2000 | Pan |
| 6,194,357 | B1 * | 2/2001 | Murata et al. ................ 508/113 |
| 6,365,864 | B1 | 4/2002 | Stava |
| 6,674,047 | B1 | 1/2004 | Hughes et al. |
| 6,750,430 | B2 | 6/2004 | Kelly |
| 6,841,246 | B2 | 1/2005 | Shimizu et al. |
| 6,855,913 | B2 | 2/2005 | Nikodym |
| 2005/0044687 | A1 * | 3/2005 | Matsuguchi et al. ........ 29/455.1 |
| 2005/0045699 | A1 | 3/2005 | Konishi et al. |
| 2005/0077277 | A1 | 4/2005 | Kim et al. |
| 2006/0160707 | A1 * | 7/2006 | Gigel ........................... 508/178 |

FOREIGN PATENT DOCUMENTS

| | | | |
|---|---|---|---|
| JP | 57193299 | | 11/1982 |
| JP | 02284792 | | 11/1990 |
| JP | 06-063792 | | 3/1994 |
| JP | 06063792 | | 3/1994 |
| JP | 2000-237894 | | 9/2000 |
| RU | 2085575 | * | 7/1997 |
| WO | WO 00/38876 | | 7/2000 |

* cited by examiner

CORED WELDING ELECTRODE AND METHODS FOR MANUFACTURING THE SAME

FIELD OF THE INVENTION

The present invention relates generally to arc welding technology, and more particularly to cored welding electrodes and methods of manufacturing the same.

INCORPORATION BY REFERENCE

Cored welding electrodes and techniques for manufacturing the same are described in the following United States patents and published applications, the contents of which are hereby incorporated by reference as background information: Weed U.S. Pat. No. 1,525,840; Lincoln U.S. Pat. No. 1,722,929; Bernard U.S. Pat. No. 2,785,285; Sjoman U.S. Pat. No. 2,944,142; Woods U.S. Pat. No. 3,534,390; Gonzalez U.S. Pat. No. 3,947,655; Gonzalez U.S. Pat. No. 4,286,293; Puschner U.S. Pat. No. 4,305,197; Amata U.S. Pat. No. 4,551,610; Holmgren U.S. Pat. No. 4,629,110; Chai U.S. Pat. No. 4,717,536; Munz U.S. Pat. No. 4,723,061; Marshall U.S. Pat. No. 4,800,131; Crockett U.S. Pat. No. 4,833,296; Chai U.S. Pat. No. 5,003,155; Crockett U.S. Pat. No. 5,015,823; Chai U.S. Pat. No. 5,055,655; Chai U.S. Pat. No. 5,118,919; Kotecki U.S. Pat. No. 5,120,931; Gordish U.S. Pat. No. 5,233,160; Crockett U.S. Pat. No. 5,365,036; Kulikowski U.S. Pat. No. 5,369,244; Araki U.S. Pat. No. 5,821,500; Kramer U.S. Pat. No. 5,973,291; Inoue U.S. Pat. No. 6,079,243; Pan U.S. Pat. No. 6,103,997; Shimizu U.S. Pat. No. 6,337,144; Kotecki U.S. Pat. No. 6,339,209; Stava U.S. Pat. No. 6,365,864; Hughes U.S. Pat. No. 6,674,047; Kelly U.S. Pat. No. 6,750,430; Nikodym U.S. Pat. No. 6,855,913; Matsuguchi US 2005/0044687 A1; and Kim US 2005/0077277 A1.

BACKGROUND OF THE INVENTION

Cored welding electrodes are widely used in arc welding processes to join metals through deposition of molten metal to a workpiece using an arc between the electrode and the workpiece. The welding electrode is directed by a wire feeder toward the welding operation in the form of a continuous wire fed through a welding torch cable from a wire supply, and an arc is generated at the torch between the end of the electrode and the workpiece for melting and depositing electrode material to a weld in a controlled fashion. Many arc welding processes, such as metal inert gas (MIG) techniques, employ an external inert shielding gas such as argon around the welding arc to inhibit oxidation or nitridation of the molten metal. Non-inert external shielding gases such as $CO_2$ may also be used, whereby such processes are sometimes generally referred to as gas metal arc welding (GMAW). Other arc shielding processes similarly provide a protective shield of vapor to cover the arc and slag to protect the molten weld pool as it cools. The molten electrode material may be transferred to the workpiece by several mechanisms or processes, such as short-circuit welding, spray arc welding, and pulse welding.

Cored welding electrodes include a tubular core or interior region surrounded by an outer sheath, where the core may include fluxing elements (e.g., flux cored electrodes), deoxidizing and denitriding agents, alloying materials, and elements that increase toughness and strength, improve corrosion resistance, and stabilize a welding arc. Flux cored arc welding (FCAW) processes employ flux-cored electrodes which include flux within the electrode core to produce an extensive slag cover during welding, where the slag protects and shapes the resulting weld bead as it cools. These processes also use a gas shield to protect the weld zone from detrimental atmospheric contamination (e.g., particularly from oxygen and/or nitrogen), where the shielding gas can be applied externally, or it may be generated from the decomposition of gas forming ingredients contained in the electrode core itself (sometimes referred to as a self-shielding flux cored electrode). In such self-shielded FCAW, the heat of the arc causes decomposition and some vaporization of the electrode's flux core, which partially protects the molten metal. For both self-shielding and gas shielded FCAW processes, it is desirable to weld with a stable electrical arc between the cored electrode and the workpiece, wherein arc stabilizing effects are primarily controlled through additives in the core fill material of the flux-cored welding electrode. In this regard, granular aluminum is sometimes provided along with other fill materials in flux-cored electrodes to improve welding arc stability and to reduce fumes during the welding process. However, conventional metal core electrodes used in gas shielded processes typically do not include arc stabilizing components in the core.

Various types of flux-cored welding electrodes are designed and manufactured for self-shielding and externally shielded FCAW applications. Such cored welding electrodes are typically constructed beginning with a flat metal strip that is initially formed first into a "U" or "V" shape, for example, as shown in Bernard U.S. Pat. No. 2,785,285, Sjoman U.S. Pat. No. 2,944,142, and Woods U.S. Pat. No. 3,534,390, with flux, alloying elements, and/or other core fill materials being deposited into the "U", after which the strip is closed into a tubular configuration by a series of forming rolls. The resulting closed cored electrode structure is then drawn to a final wire diameter and the outer sheath surface is treated with a feeding lubricant to enhance feedability during welding. In a typical welding system, the welding electrode is fed through a welder cable, sometimes referred to as a torch cable, which can be five to twenty feet or more in length, to a welding gun or torch, and then to the welding process at which the welding arc is established. The feeding lubricant applied on the finished diameter of the electrode helps the electrode in traveling through the welding torch cable. It is therefore a continuing goal to provide cored welding electrode wire having consistent arc stabilizer content and suitable feedability for use with automatic wire feeders in self-shielded and gas shielded FCAW processes.

SUMMARY OF INVENTION

A summary of one or more aspects of the invention is now presented to facilitate a basic understanding thereof, wherein this summary is not an extensive overview of the invention, and is intended neither to identify certain elements of the invention, nor to delineate the scope of the invention. Rather, the primary purpose of the summary is to present some concepts of the invention in a simplified form prior to the more detailed description that is presented hereinafter.

The invention relates to cored welding electrodes, such as flux-cored electrodes and other welding electrodes having an outer sheath that wholly or partially encloses a core fill material as well as a sodium based feeding lubricant coating. The invention further relates to methods or processes for manufacturing cored welding electrodes with sodium based feeding lubricant being applied to the cored electrode structure for feedability through a wire feeder apparatus together with improved welding arc stability. Whereas conventional wisdom focused on core fill material content for arc stabilization, with the lubricant coating being applied solely with an eye toward improved feedability, the inventor has found that providing a sodium based feeding lubricant on the outer sheath of a cored welding electrode can enhance arc stability while still providing suitable feedability. For self-shielded and gas shielded flux cored wire, the majority of arc stabilizers are inside the fill or are not provided at all (e.g., in metal core electrodes). In the electrodes and methods of the invention, however, the inventor has found that surface sodium from the feeding lubricant, particularly sodium sulfate, sodium carbonate, and/or sodium nitrite, operates to enhance arc stabilization. In metal-core gas shielded flux cored electrodes having minimal or no arc stabilizers in the core fill, moreover, arc stability can be enhanced by sodium on the outer electrode surface (e.g., provided by the sodium based feeding lubricant coating). Furthermore, the amount of sodium based feeding lubricant is controllable to provide acceptable feedability along with arc stabilization.

One aspect of the invention provides methods for manufacturing cored welding electrode, comprising providing a cored electrode structure with core fill material substantially enclosed within a sheath material, and applying a sodium based feeding lubricant to the cored electrode structure to provide a coated cored electrode, where the feeding lubricant comprises at least one of sodium sulfate, sodium carbonate, and sodium nitrite. In one embodiment, the feeding lubricant comprises about 1 to 15 percent sodium sulfate, 1 to 15 percent sodium carbonate, and/or about 1 to 10 percent sodium nitrite by weight, with a remaining 60 to 85 percent being stearate material, where the sodium based feeding lubricant is applied after drawing the cored electrode structure to a final wire diameter. The amount of the sodium based feeding lubricant applied to the cored electrode can also be controlled in manufacturing so as to provide acceptable feedability while enhancing arc stability. In one possible implementation, the sodium based feeding lubricant is provided as powder or granular material in a container, with the formed cored electrode structure being passed through the lubricant in the container over a predetermined linear distance, wherein one or both of the wire speed and the container distance are controlled to provide a desired amount of feeding lubricant coating on the cored electrode.

Another aspect of the invention provides a cored welding electrode, comprising a core fill material substantially enclosed in a tubular sheath material, with a sodium based lubricant coating on an outer surface of the sheath material, where the sodium based feeding lubricant comprises one or more of sodium sulfate, sodium carbonate, and sodium nitrite. In one example, the electrode is a flux-cored electrode having a granular or powder core fill material including flux materials. The electrode, moreover, may include remnant drawing lubricant situated between at least a portion of the outer surface of the sheath material and the sodium based feeding lubricant.

BRIEF DESCRIPTION OF THE DRAWINGS

The following description and drawings set forth in detail certain illustrative implementations of the invention, which are indicative of several exemplary ways in which the principles of the invention may be carried out. Various objects, advantages, and novel features of the invention will become apparent from the following detailed description of the invention when considered in conjunction with the drawings, in which.

DETAILED DESCRIPTION OF THE INVENTION

The invention relates to manufacturing of cored welding electrodes with sodium based feeding lubricant coatings. One or more exemplary implementations of the present invention are hereinafter illustrated and described, wherein like reference numerals are used to refer to like elements throughout and wherein the illustrated structures are not necessarily drawn to scale.

Figure 1:
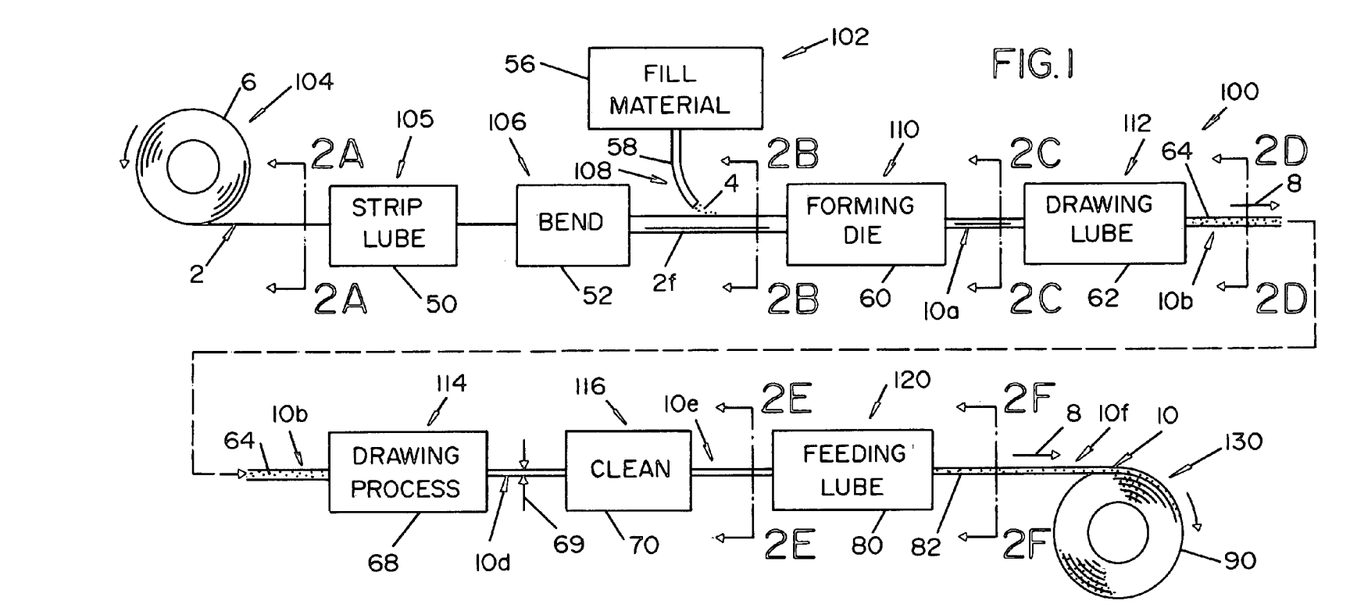
FIG. 1 is a schematic diagram illustrating an exemplary process for manufacturing cored welding electrode in accordance with one or more aspects of the invention.
Figure 5:
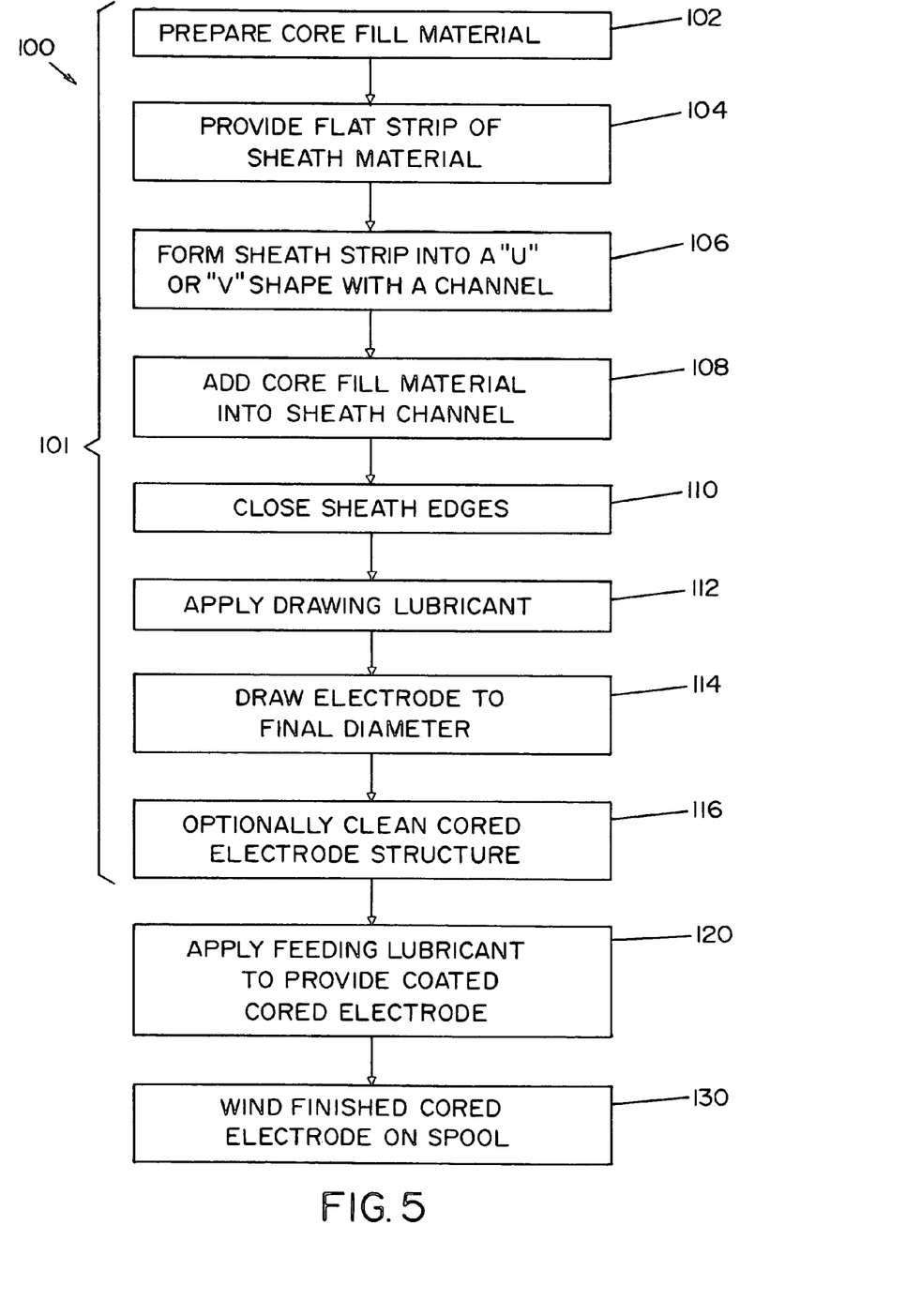
FIG. 5 is a flow diagram illustrating an exemplary process or method of manufacturing cored welding electrode in accordance with the present invention.

FIGS. 1 and 5 show an exemplary flux cored welding electrode manufacturing process or method 100 in which a flux or metal cored electrode is provided with a sodium based feeding lubricant coating in accordance with the invention to enhance welding arc stability and feedability in a welding process. While illustrated and described herein as a series of acts or events, it will be appreciated that the exemplary process or method 100 and other processes of the invention are not limited by the illustrated ordering of such acts or events. In this regard, some acts or events may occur in different orders and/or concurrently with other acts or events apart from those illustrated and described herein, in accordance with the invention. It is further noted that not all illustrated steps may be required to implement a process in accordance with the present invention. The methods of the invention, moreover, may be implemented in association with the illustrated structures and systems as well as with other apparatus not illustrated or described, wherein all such alternatives are contemplated as falling within the scope of the invention and the appended claims.

The exemplary manufacturing process 100 begins with a strip of substantially flat sheath material 2 being provided at a first end in continuous fashion, and ends with manufactured cored welding electrode wire 10 with a sodium based lubricant coating being wound onto cylindrical spools 90 for shipment and/or storage, with the finished electrode 10 being separated from the process 100 as spools 90 or bulk wire containers are wound to capacity, at which time another container reel or spool 90 is inserted while the process 100 continues. Process 100, moreover, may be implemented as a continuous process or may be partitioned into two or more tiers or stages, for example, with cored electrode being stored on temporary storage reels or spools between manufacturing stages. FIG. 1 shows the manufacturing process 100, FIG. 5 provides a flow diagram thereof, and FIGS. 2A-2G show sectional views of electrode 10 at various points in the manufacturing process 100 of FIGS. 1 and 5. As shown in FIG. 5, process 100 in general provides for manufacture of a cored electrode structure at 101, followed by application of sodium based feeding lubricant at 120 before the electrode 10 is packaged at 130.

As shown in FIGS. 1 and 5, core fill material 4 is prepared or otherwise provided at 102 along with provision of a flat strip 2 of sheath material at 104. Any suitable electrode sheath material 2 and core fill material 4 may be employed in implementing the present invention, for example, using a mild steel sheath material 2 with core material 4 including fluxing and alloying materials, where materials 2 and 4 in general are selected to provide weld joint filler metal and also for deoxidizing, denitriding, slag formation, arc stabilization, alloying, and/or to provide shielding gas for a target welding process. In one implementation, sheath 2 preferably comprises about 75 to 90 percent of the electrode 10 by weight, with core material 4 providing the remaining 10 to 25 percent, although such relative weights are not a requirement of the present invention. In general, sheath material 2 may be any suitable ferrous or non-ferrous metal, alloy composition, or a bimetallic structure comprising two or more different alloys, which is useful for producing flux-cored welding electrodes, such as steel, where the sheath material 2 employed in a given electrode manufacturing process may be selected according to the type of welding process in which the coated and packaged electrode 10 will be employed. In this regard, the materials 2, 4 may be selected according to whether the target welding process is self-shielded or whether external shielding gas is to be used. Core fill material 4 may include any type of solid and/or liquid material that operates to provide desired welding conditions and/or materials during use in a welding process. In one suitable example, core fill material 4 comprises a granular and/or powder form of one or more materials to provide welding flux in a welding operation, to control or inhibit oxidation and/or nitridation in the finished weld metal, alone or in combination with alloying materials to control the material content of the finished weld metal (e.g., elements to increase weld joint strength and/or toughness and/or to enhance corrosion resistance), and/or for welding arc stabilization. In this regard, the sodium based feeding lubricant 82 applied later in the manufacturing process 100 aids in stabilizing a welding arc regardless of whether arc stabilizing materials are provided in the core fill material 4. The selection of core fill material 4, moreover, may also account for whether the cored-electrode is intended for self-shielding or gas shielded welding processes. In this regard, core fill material 4 for self-shielding type flux-cored electrode 10 wires preferably includes additional gas forming elements to inhibit or prevent ambient oxygen and/or nitrogen from contacting metal being transferred across a welding arc and/or deposited metal of the molten weld puddle or pool on the workpiece. Core fill material 4 is preferably in powder or granular form, including one or more powders typically used in cored electrodes as alloying agents, fluxing agents, slag formers, arc stabilizers, deoxidizers, desulfurizers, denitriders, dephosphorizers, or other constituents to achieve one or more desired operating characteristics during welding, such as reducing spatter, improving weld bead appearance, etc. Examples of suitable arc stabilizers include but are not limited to graphite, sodium titanate, potassium titanate, and feldspars, and some useful slag forming and gas forming materials include titanium dioxide, silicon dioxide, magnesium oxide, aluminum oxides, carbonates, fluorides, and the like. Core material 4 may include alloying agents, such as chromium, aluminum, titanium, boron, iron, copper, cobalt, manganese, vanadium, nickel, molybdenum, niobium, tungsten, and/or alloys thereof, and some suitable deoxidizing, desulfurizing, and/or denitriding materials may be used, for example, calcium, titanium, barium, magnesium, aluminum, silicon, zirconium, rare earths metals, and/or alloys thereof.

Figure 2A:
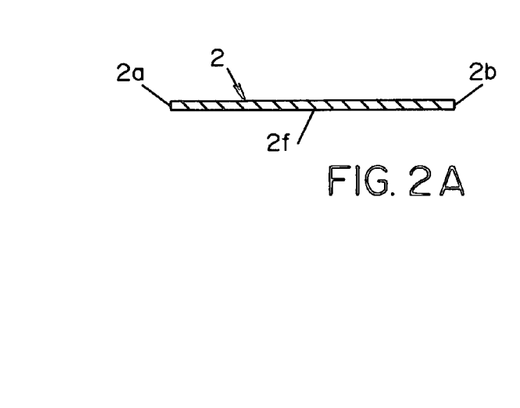
FIG. 2A is a partial end elevation view in section taken along line 2A-2A of FIG. 1, illustrating a flat strip of sheath material used in manufacturing the cored electrode.
Figure 2B:
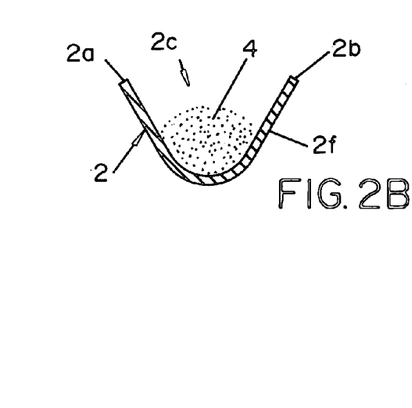
FIG. 2B is a partial end elevation view in section taken along line 2B-2B of FIG. 1, illustrating the sheath strip formed into a U or V shape with core fill material added to a channel of the formed sheath.

Sheath strip 2 includes two generally parallel laterally opposite outer edges 2a and 2b, as well as a lower edge or surface 2f that will subsequently form an outer surface of the cored electrode sheath 2 (FIG. 2A), with sheath strip material 2 being provided from a roll 6 (FIG. 1) or other supply in a continuous form. An initial strip lubricant (not shown) may be provided to surface 2f of strip 2 at 105 via any suitable lubrication providing process and apparatus 50 (FIG. 1), so as to facilitate initial bending or forming operations in the process 100. At 106 in FIGS. 1 and 5, strip 2 is formed (e.g., bent) into a "U" or "V" shape, thereby providing a channel 2c between outer edges 2a and 2b, as best shown in FIG. 2B. Sheath material 2 is supported throughout process 100 along various guiding and support apparatus (not shown) and translated along an axial direction indicated by arrow 8 in FIG. 1, where suitable forming rollers and/or dies 52 are employed at 106 to initially form sheath strip 2 into a V or U shape, thereby providing channel 2c. Fill material 4 is then introduced or added at 108 into channel 2c (FIG. 2B), for example, using a granule feeding apparatus having a hopper or store 56 and a controllable feeding tube 58 (FIG. 1) configured to supply core fill material 4 to channel 2c at a volume transfer rate determined according to the speed at which strip 2 is translated in direction 8 and according to the desired final dimensions of finished cored electrode 10.

Figure 2C:
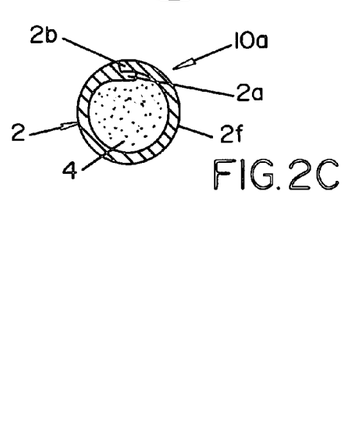
FIG. 2C is a partial end elevation view in section taken along line 2C-2C of FIG. 1, illustrating the sheath strip with lateral sheath strip edges joined to create a cored electrode structure with fill material substantially enclosed within the sheath material.
Figure 2D:
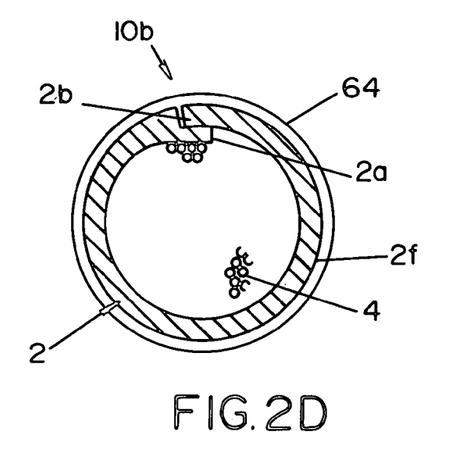
FIG. 2D is an enlarged end elevation view in section taken along line 2D-2D of FIG. 1, illustrating the cored electrode coated with a drawing lubricant prior to being drawn to a final wire diameter.
Figure 2E:
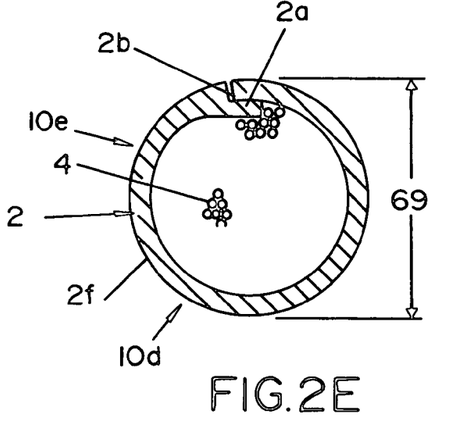
FIG. 2E is an enlarged partial end elevation view taken along line 2E-2E of FIG. 1 illustrating the cored electrode following a drawing process to compact the core fill material and set the final outer wire diameter and after a subsequent cleaning operation in the manufacturing process.

Process 100 continues at 110, where strip edges 2a and 2b are joined or otherwise closed to form a sheath seam or joint by procession of strip 2 through a forming die or a series of forming rolls 60 to provide a cored electrode structure 10a with core fill material 4 being substantially enclosed within sheath material 2 (FIGS. 1 and 2C), wherein edges 2a and 2b at the sheath seam may abut one another or may be folded over one another as in the exemplary electrode 10a of FIG. 2C. Core fill material 4 may be substantially enclosed by sheath 2 at 110 in any suitable fashion, preferably with a resulting seam between sheath edges 2a and 2b being impervious to moisture, although perfect joinder or closure is not a strict requirement of the invention. In this regard, the seam between sheath edges 2a and 2b may optionally be welded or further closed with adhesives (not shown). As shown in FIGS. 1, 2D, and 5, core fill material 4 may remain somewhat loosely packed at this point, with the outer diameter of cored electrode structure 10a being slightly larger than the desired final production specification. Accordingly, the electrode 10a is provided with an external coating of drawing lubricant 64 at 112 using any lubricant application process 62 and subjected to a drawing process 68 at 114 to compact core material 4 and to set a final outer wire diameter. Drawing process 68 may be any suitable wire forming process, for example, feeding the cored electrode structure 10b through one or more dies and/or forming rolls, wherein drawing lubricant may be applied prior to any or all such forming devices to provide lubrication during forming steps. Following the drawing operation at 114, the drawn and compacted electrode 10d may optionally cleaned using a thermal or other type cleaning operation 70 at 116 to remove some or all residual drawing lubricant 64 from outer surface 2f, although some drawing lubricant 64 may remain after the cleaning operation 70, forming part of the finished cored welding electrode 10f after application of the sodium based feeding lubricant. In the illustrated example, the resulting drawn and cleaned cored electrode structure 10e is shown in FIG. 2E having the desired final OD 69 that ensures or facilitates compatibility between the cored electrode 10 and a wire feeder 210 employed in a target welding process WP (FIG. 4 below), wherein the compaction of fill material 4 ensures the appropriate proportions of sheath steel material 2 and fill material 4 to achieve the desired weld properties therein.

Figure 2F:
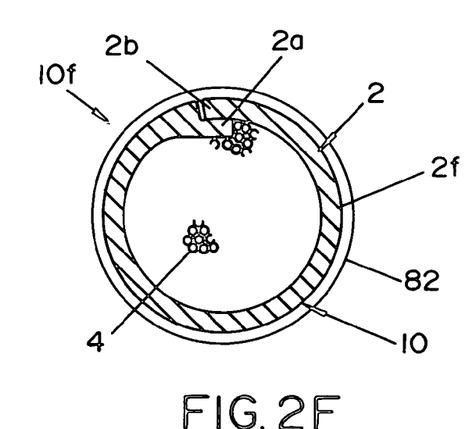
FIG. 2F is an enlarged partial end elevation view taken along line 2F-2F of FIG. 1 illustrating the cored electrode coated with a sodium based feeding lubricant applied over the outer sheath surface for feedability and arc stabilization in accordance with the invention.
Figure 2G:
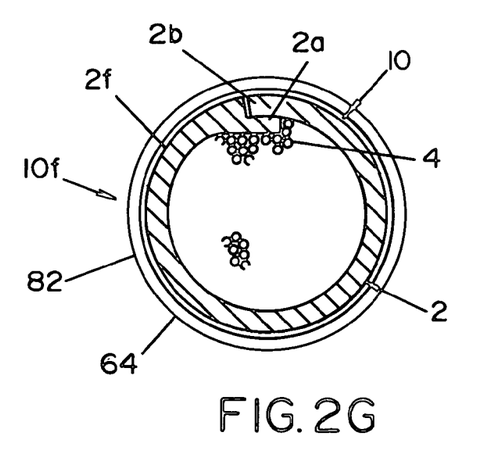
FIG. 2G is an enlarged partial end elevation view taken along line 2F-2F of FIG. 1 illustrating another possible cored electrode in accordance with the invention, with remnant drawing lubricant on a portion of the outer sheath surface, with a feeding lubricant coating applied over the remaining drawing lubricant and the outer sheath surface.

According to one or more aspects of the present invention, a sodium based feeding lubricant 82 is applied to electrode 10e at 120 in a lubricant application process 80 (FIG. 1) in order to provide finished or final coated flux cored welding electrode 10f, best shown in FIG. 2F, wherein the feeding lubricant 82 resides on the outer sheath surface 2f and/or on any remnant drawing lubricant 64 (FIG. 2G). The feeding lubricant 82 includes sodium sulfate ($Na_2SO_4$), sodium carbonate ($NaCO_3$), and/or sodium nitrite ($NaNO_2$), or stoichiometric variations thereof, and may also include other materials, such as stearate. As shown in FIGS. 2F and 2G, the invention thus provides a cored welding electrode having sheath material 2 in the form of a continuous tubular structure defining a center core area filled with core material 4, and a sodium based lubricant coating 82 on outer sheath surface 2f. In this regard, one or more material layers may be present between outer sheath surface 2f and coating 82, for example, remaining drawing lubricant 64 between at least a portion of surface 2f and the sodium based feeding lubricant 82, as shown in FIG. 2G. Any suitable material 82 may be applied in process 80 at 120 that includes one or more of sodium sulfate, sodium carbonate, and sodium nitrite using any suitable lubricant application process 80 within the scope of the invention. In one preferred embodiment, material 82 includes about 1 to 15 percent sodium sulfate by weight, alone or in combination with other sodium based constituents. In another embodiment, the feeding lubricant 82 comprises about 1 to 15 percent sodium carbonate by weight. Yet another possible implementation provides lubricant 82 having about 1 to 10 percent sodium nitrite by weight. Moreover, any combinations of sodium sulfate, sodium carbonate, and/or sodium nitrite can be used, for example, in the above percentage ranges, with a remaining portion of material 82 being stearate or other material (e.g., 60 to 85 percent stearate in one example). In the exemplary process 100, feeding lubricant 82 is provided following drawing operation 68, although this is not a strict requirement of the invention, wherein lubricant 82 may be applied anywhere in a manufacturing process 100 within the scope of the invention and the appended claims.

Figure 3:
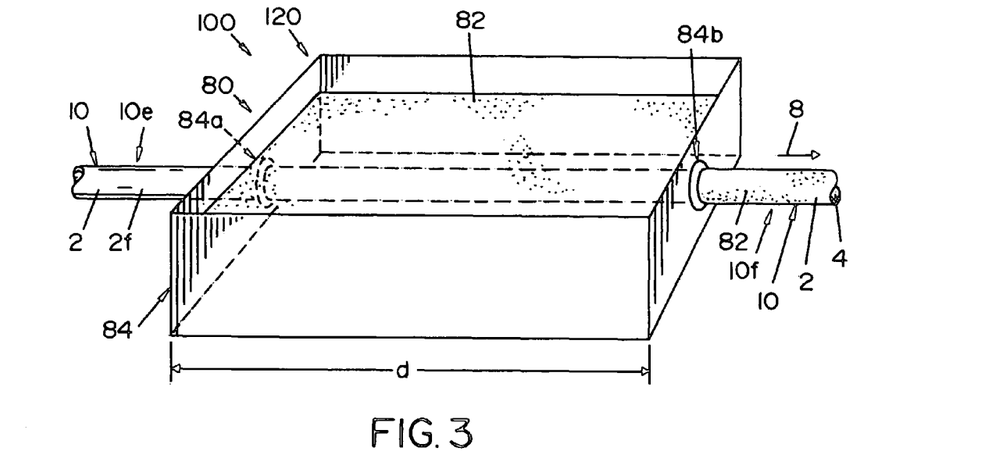
FIG. 3 is a perspective view illustrating an exemplary sodium based feeding lubricant coating operation in the manufacturing process of FIG. 1, in which a granular or powder lubricant is provided in a container and the cored electrode structure is drawn through the container to provide a coated cored electrode with sodium based feeding lubricant coating following drawing of the electrode to a final wire diameter.

Referring also to FIG. 3, any suitable lubricant application systems and methodologies may be employed to coat outer electrode sheath surface 2f with lubricant 82 at 120 within the scope of the invention. FIG. 3 illustrates one such system 80 for applying sodium based feeding lubricant at 120, in which lubricant 82 is provided in the form of granules or powder 82 including one or more of sodium sulfate, sodium carbonate, and sodium nitrite in a substantially rectangular box or container 84 with a longitudinal length d and having entrance and exit openings 84a and 84b, respectively. Container 84 is filled with granular and/or powder lubricant 82 to a level above that of openings 84a and 84b, and drawn electrode 10e is provided to entrance opening 84a and is thereafter passed through lubricant 82 in container 84 to exit opening 84b over the predetermined linear distance d. Lubricant particles 82 adhere to outer surface 2f as a result of electrode 10 being passed through container 84, whereby a coated cored electrode 10f is provided at the output of lubricant application process/system 80 with a sodium based lubricant coating 82, as best shown in FIGS. 2F and 2G. According to another aspect of the invention, moreover, the amount of applied feeding lubricant 82 is controlled by adjusting the speed at which electrode 10 is passed through lubricant 82 in direction 8 and/or by controlling or adjusting the predetermined linear distance d of container 84, wherein different containers 84 may be employed having different longitudinal lengths d for different desired coating amounts and/or for different linear drawing speeds. In this fashion, the amount of coating lubricant 82 applied to surface 2f of electrode 10f is controllable in the manufacturing process 100.

After lubricant application at 120, finished electrode 10f includes fill material 4 completely and uniformly compacted with a final outer diameter 69, wherein the lubricant 82 operates to enhance feedability of electrode 10f in a subsequent welding operation (e.g., FIG. 4), and enhances arc stability therein. The finished electrode 10f is then stored or wound onto reel 90 at 130 as shown in FIG. 1. Process 100 preferably ensures a seam joint of sheath edges 2a and 2b that will not separate during storage on reel 90, or in operational use when fed through a wire feeder 210 to a welding process WP. In this regard, the integrity of the seam or joinder of edges 2a and 2b may impact welding performance of electrode 10 with respect to preventing loss of material 4 from the core and/or inhibiting moisture penetration through sheath 2 into core fill material 4. In addition, uniformity of the seam joint and the final outer diameter 69, as well as uniformity of core compaction and uniformity of feeding lubricant coating 82 may affect feedability and/or electrical properties of finished electrode 10f in use, wherein process 100 may be designed with these considerations in mind so as to avoid or mitigate feeding problems, sporadic arc engagement problems, and discontinuities in the applied coatings at 105, 112, and/or 120.

Figure 4:
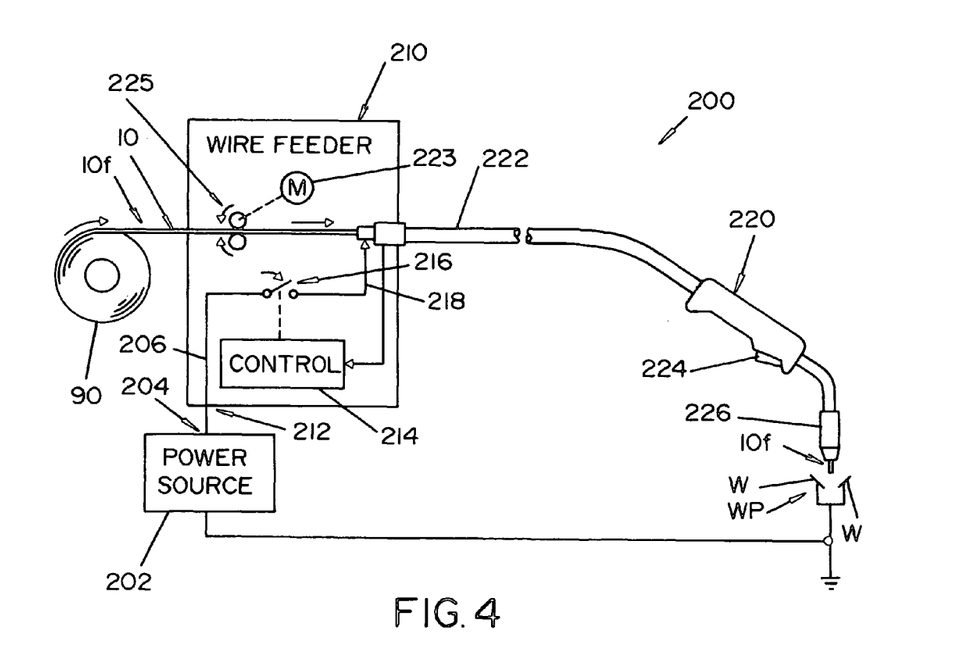
FIG. 4 is a simplified side elevation view illustrating an exemplary flux cored arc welding process using the cored electrode manufactured in FIG. 1.

FIG. 4 illustrates a welder or welding system 200 in which the finished cored electrode 10f may be employed in performing a FCAW welding operation or process WP. System 200 includes a power source 202, a wire feeder 210 and a welding torch 220 coupled to wire feeder 210 by a torch cable 222. Power source 202 converts input power to create welding current and voltage waveforms (e.g., a welding signal) at an electrical output 204 thereof for selective application of the welding signal to welding process WP through an electrical circuit formed by a power source cable 206, a wire feeder input 212 and a switch 216 in wire feeder 210, as well as an output cable 218 providing connection from switch 216 to torch cable 222. An operator (not shown) engages or actuates a torch trigger 224 that signals a wire feeder controller 214 to close switch 216 to thereby provide welding current to a contact inside a torch nozzle 226. This causes creation of a welding arc (not shown) between the end of electrode 10f and a workpiece W that is grounded to a ground terminal of power source 202. Wire feeder 210 also operates according to the torch trigger signal to selectively feed cored welding electrode 10f to torch cable 222 from supply reel 90, where reel 90 may be internal to or outside of the enclosure of wire feeder 210. Cored electrode wire 10f is drawn or paid out from supply reel 90 via a motorized wire feeding system including a motor 223 driving one or more feed rolls 225 so as to direct electrode 10f from reel 90 to welding process WP through torch cable 222, wherein motor 223 may be separately supplied or may be powered by power from power source cable 206. Wire feeder 210 may optionally include apparatus (not shown) for directing shielding gas to welding process WP through torch cable 222, wherein the trigger actuation also controls operation of the motorized feeding system and the optional provision of external process shielding gas.

The invention has been illustrated and described with respect to one or more exemplary implementations or embodiments. However, equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

Having thus described the invention, the following is claimed:

1. A method of manufacturing cored welding electrode, said method comprising:
   providing a cored electrode structure with core fill material substantially enclosed within a sheath material; and
   applying a sodium based feeding lubricant to said cored electrode structure to provide a coated cored electrode, said sodium based feeding lubricant comprising
      a sodium sulfate,
      a sodium carbonate, and
      a sodium nitrite.

2. A method as defined in claim 1, wherein said feeding lubricant comprises
   about 1 percent sodium sulfate or more by weight and
   about 15 percent sodium sulfate or less by weight.

3. A method as defined in claim 2, wherein said feeding lubricant comprises
   about 1 percent sodium carbonate or more by weight and
   about 15 percent sodium carbonate or less by weight.

4. A method as defined in claim 1, wherein said feeding lubricant comprises
   about 1 percent sodium carbonate or more by weight and
   about 15 percent sodium carbonate or less by weight.

5. A method as defined in claim 4, wherein said feeding lubricant comprises
   about 1 percent sodium nitrite or more by weight and
   about 10 percent sodium nitrite or less by weight.

6. A method as defined in claim 3, wherein said feeding lubricant comprises
   about 1 percent sodium nitrite or more by weight and
   about 10 percent sodium nitrite or less by weight.

7. A method as defined in claim 2, wherein said feeding lubricant comprises
   about 1 percent sodium nitrite or more by weight and
   about 10 percent sodium nitrite or less by weight.

8. A method as defined in claim 1, wherein said feeding lubricant comprises
   about 1 percent sodium nitrite or more by weight and
   about 10 percent sodium nitrite or less by weight.

9. A method as defined in claim 8, wherein said feeding lubricant comprises
   about 60 percent stearate or more by weight.

10. A method as defined in claim 7, wherein said feeding lubricant comprises
    about 60 percent stearate or more by weight.

11. A method as defined in claim 6, wherein said feeding lubricant comprises
    about 60 percent stearate or more by weight.

12. A method as defined in claim 5, wherein said feeding lubricant comprises
    about 60 percent stearate or more by weight.

13. A method as defined in claim 4, wherein said feeding lubricant comprises
    about 60 percent stearate or more by weight.

14. A method as defined in claim 3, wherein said feeding lubricant comprises
    about 60 percent stearate or more by weight.

15. A method as defined in claim 2, wherein said feeding lubricant comprises
    about 60 percent stearate or more by weight.

16. A method as defined in claim 1, wherein said feeding lubricant comprises
    about 60 percent stearate or more by weight.

17. A method as defined in claim 8, wherein providing said cored electrode structure comprises
    forming a strip of sheath material around a core fill material to provide a cored electrode structure with said fill material substantially enclosed within said sheath material, and
    drawing said cored electrode structure to a final wire diameter, and wherein said sodium based feeding lubricant is applied to said cored electrode structure after drawing said cored electrode structure to said final wire diameter.

18. A method as defined in claim 4, wherein providing said cored electrode structure comprises
    forming a strip of sheath material around a core fill material to provide a cored electrode structure with said fill material substantially enclosed within said sheath material, and
    drawing said cored electrode structure to a final wire diameter, and
    wherein said sodium based feeding lubricant is applied to said cored electrode structure after drawing said cored electrode structure to said final wire diameter.

19. A method as defined in claim 2, wherein providing said cored electrode structure comprises forming a strip of sheath material around a core fill material to provide a cored electrode structure with said fill material substantially enclosed within said sheath material, and drawing said cored electrode structure to a final wire diameter, and wherein said sodium based feeding lubricant is applied to said cored electrode structure after drawing said cored electrode structure to said final wire diameter.

20. A method as defined in claim 1, wherein providing said cored electrode structure comprises forming a strip of sheath material around a core fill material to provide a cored electrode structure with said fill material substantially enclosed within said sheath material, and drawing said cored electrode structure to a final wire diameter, and wherein said sodium based feeding lubricant is applied to said cored electrode structure after drawing said cored electrode structure to said final wire diameter.

21. A method as defined in claim 20, wherein applying said sodium based feeding lubricant to said cored electrode structure comprises providing said sodium based feeding lubricant in the form of granules or powder in a container, and passing said cored electrode structure through said sodium based feeding lubricant in said container over a predetermined linear distance.

22. A method as defined in claim 19, wherein applying said sodium based feeding lubricant to said cored electrode structure comprises providing said sodium based feeding lubricant in the form of granules or powder in a container, and passing said cored electrode structure through said sodium based feeding lubricant in said container over a predetermined linear distance.

23. A method as defined in claim 18, wherein applying said sodium based feeding lubricant to said cored electrode structure comprises providing said sodium based feeding lubricant in the form of granules or powder in a container, and passing said cored electrode structure through said sodium based feeding lubricant in said container over a predetermined linear distance.

24. A method as defined in claim 17, wherein applying said sodium based feeding lubricant to said cored electrode structure comprises providing said sodium based feeding lubricant in the form of granules or powder in a container, and passing said cored electrode structure through said sodium based feeding lubricant in said container over a predetermined linear distance.

25. A method as defined in claim 1, wherein applying said sodium based feeding lubricant to said cored electrode structure comprises providing said sodium based feeding lubricant in the form of granules or powder in a container, and passing said cored electrode structure through said sodium based feeding lubricant in said container over a predetermined linear distance.

26. A method as defined in claim 25, further comprising controlling an amount of said sodium based feeding lubricant applied to said cored electrode.

27. A method as defined in claim 24, further comprising controlling an amount of said sodium based feeding lubricant applied to said cored electrode by controlling at least one of a speed at which said cored electrode structure is passed through said sodium based feeding lubricant and said predetermined linear distance.

28. A method as defined in claim 23, further comprising controlling an amount of said sodium based feeding lubricant applied to said cored electrode by controlling at least one of a speed at which said cored electrode structure is passed through said sodium based feeding lubricant and said predetermined linear distance.

29. A method as defined in claim 22, further comprising controlling an amount of said sodium based feeding lubricant applied to said cored electrode by controlling at least one of a speed at which said cored electrode structure is passed through said sodium based feeding lubricant and said predetermined linear distance.

30. A method as defined in claim 21, further comprising controlling an amount of said sodium based feeding lubricant applied to said cored electrode by controlling at least one of a speed at which said cored electrode structure is passed through said sodium based feeding lubricant and said predetermined linear distance.

31. A method as defined in claim 1, further comprising controlling an amount of said sodium based feeding lubricant applied to said cored electrode.

32. A cored welding electrode, comprising:

a sheath material in the form of a continuous tubular structure with an outer surface and an inner surface defining a center core area;

a core fill material within said core area, said core fill material being substantially enclosed within said sheath material; and a sodium based lubricant coating on said outer surface of said sheath material, said sodium based feeding lubricant comprising a sodium sulfate, a sodium carbonate, and a sodium nitrite.

33. A cored welding electrode as defined in claim 32, wherein said core fill material is a granular or powder fill material including flux materials.

34. A cored welding electrode as defined in claim 32, comprising a lubricant situated between at least a portion of said outer surface of said sheath material and said sodium based feeding lubricant.

* * * * *